United States Patent
Day et al.

(10) Patent No.: US 10,473,789 B1
(45) Date of Patent: Nov. 12, 2019

(54) REAL-TIME SHIP POSITION ERROR COMPENSATION SYSTEM AND METHOD

(71) Applicant: Lockheed Martin Corporation, Bethesda, MD (US)

(72) Inventors: Dana L. Day, Turnersville, NJ (US); Leszek J. Sczaniecki, Marlton, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 440 days.

(21) Appl. No.: 14/685,007

(22) Filed: Apr. 13, 2015

(51) Int. Cl.
G01S 19/06 (2010.01)

(52) U.S. Cl.
CPC ................................. G01S 19/06 (2013.01)

(58) Field of Classification Search
CPC .......... G01S 19/06; G01S 19/07; G01S 19/41; G01S 19/421; G01S 19/423; G01S 19/43; G01S 19/45; G01S 19/47; G01S 19/48; G01S 19/53; G01S 19/54; G01S 5/0263
See application file for complete search history.

(56) References Cited

U.S. PATENT DOCUMENTS

| | | | |
|---|---|---|---|
| 4,531,299 A | 7/1985 | Wolfe et al. | |
| 4,881,080 A * | 11/1989 | Jablonski | G01S 3/14 342/357.36 |
| 5,548,293 A * | 8/1996 | Cohen | G01S 5/0009 342/352 |
| 5,617,317 A * | 4/1997 | Ignagni | G01C 21/165 342/357.31 |
| 5,757,646 A * | 5/1998 | Talbot | G01S 19/04 342/457 |
| 5,948,044 A * | 9/1999 | Varley | G01S 19/47 701/472 |
| 6,037,893 A * | 3/2000 | Lipman | G01C 21/165 342/184 |
| 6,278,402 B1 * | 8/2001 | Pippin | A63B 71/0622 342/357.4 |
| 7,768,451 B2 * | 8/2010 | Wu | G01S 19/44 342/357.23 |
| 8,952,845 B1 | 2/2015 | Day et al. | |
| 2005/0012660 A1 * | 1/2005 | Nielsen | G01S 19/04 342/357.31 |

(Continued)

*Primary Examiner* — Bernarr E Gregory
*Assistant Examiner* — Daniel P Malley, Sr.
(74) *Attorney, Agent, or Firm* — Howard IP Law Group

(57) ABSTRACT

A system for measuring the position of an asset is provided. The system includes a first plurality of global positioning system (GPS) sensors arranged on a first asset, and a reference position source arranged on the first asset. One or more computer processors is provided in communication with a memory and is configured to measure position data associated with the first asset from the outputs of the first plurality of GPS sensors, and calculate a measurement offset between the measured position data associated with the first asset and position data obtained from the reference position source. From these measurements, position data measurements obtained from the plurality of GPS sensors of the first asset may be corrected using the calculated measurement offset. Likewise, position data measurements obtained from a plurality of GPS sensors of a second asset, located remotely from the first asset, are also corrected using the calculated measurement offset.

8 Claims, 10 Drawing Sheets

(56) References Cited

U.S. PATENT DOCUMENTS

| | | | | |
|---|---|---|---|---|
| 2006/0022870 A1* | 2/2006 | Zimmerman | ......... | G01S 5/0009 |
| | | | | 342/464 |
| 2009/0027262 A1* | 1/2009 | Wu | ......... | G01S 19/04 |
| | | | | 342/357.27 |
| 2010/0166044 A1* | 7/2010 | Offer | ......... | G01S 19/04 |
| | | | | 375/148 |
| 2012/0265375 A1* | 10/2012 | Dutton | ......... | B63G 11/00 |
| | | | | 701/16 |
| 2013/0069822 A1* | 3/2013 | Wu | ......... | G01S 19/49 |
| | | | | 342/357.24 |
| 2014/0121909 A1* | 5/2014 | Fehr | ......... | E02F 3/842 |
| | | | | 701/50 |
| 2014/0129126 A1* | 5/2014 | Richardson | ......... | G01S 19/51 |
| | | | | 701/300 |

* cited by examiner

REAL-TIME SHIP POSITION ERROR COMPENSATION SYSTEM AND METHOD

FIELD OF THE INVENTION

The present invention relates to systems and methods for generating real-time normalized position data for use among multiple remote marine platforms.

BACKGROUND

Accurate tracking of targets (e.g. radar tracking of airborne targets) among multiple floating platforms or vessels at sea, as well as sharing tracking data among multiple floating platforms and land-based systems, requires increasingly advanced technical innovations to provide corrections to internal ship flexure and relative earth coordinates. Positioning systems according to the prior art typically attempt to acquire satellite tracking data over a period of hours, determine errors, and apply appropriate corrections. However, these processes ignore any shifts in static flexure or any current dynamic flexure errors of the platforms or vessels being tracked. These types of bias changes may be the result of many factors, including temperature distortions (e.g. from the sun), which can be observed in a matter of minutes after maneuvering a ship, or in mere seconds in the case of dynamic flexure events. Accordingly, hours of data acquisition would be insufficient to accomplish an accurate correction solution without some additional augmentation. Moreover, these systems inherently introduce errors as a result of inaccuracies in their measuring devices.

Referring generally to FIG. 1, there is shown an exaggerated illustration of the above-described errors induced by current GPS-based positioning systems employed on vessels 100,101,102. These errors include, for example, deviations in perceived True North and actual True North bearings, as well as deviations in perceived location versus an actual or true location. In addition, a ship can distort such that one structural section can be out of phase in roll, pitch or yaw with respect to another structural section. The errors may create significant performance reductions when affected position data is utilized by on-ship systems. For example, a ship's on-board radar system may magnify these errors when attempting to track distant airborne targets. Further still, these inaccuracies may result in increased difficulties performing operations among multiple ships. By way of example, exchanging radar tracking or track data of an airborne target between multiple platforms may be detrimentally affected by the discrepancies between the relative reference positions of each platform and its influence on a perceived measured flight path. This may result in the creation of one or more sets of phantom tracks in gridlocking processes resulting from these discrepancies.

As will be understood by one of ordinary skill in the art, the term gridlocking is generally used to describe a process of receiving track data from multiple source locations and correlating jointly held targets to build a composite track, larger in volume compared to that achievable by a single source. One issue is that track data from multiple sensors on one platform can have time varying biases from each sensor, but gridlocking techniques apply a single correction for data from one platform. This can create multiples of a single target or even delete a valid target from consideration in the composite track picture.

Alternative systems and methods to determine local flexure corrections, roll and pitch values, as well as for determining relative True North for use by multiple platforms are desired.

SUMMARY

In one embodiment of the present disclosure, a system for measuring the position of an asset is provided. The system includes a first plurality of global positioning system (GPS) sensors (e.g. two sensors) arranged on a first asset, and a reference position source arranged on the first asset. One or more computer processors is provided in communication with a memory and is configured to measure position data associated with the first asset from the outputs of the first plurality of GPS sensors, and calculate a measurement offset between the measured position data associated with the first asset and position data obtained from the reference position source. Position data measurements obtained from the plurality of GPS sensors of the first asset may be corrected using the calculated measurement offset. Likewise, position data measurements obtained from a plurality of GPS sensors of a second asset, located remotely from the first asset, are also corrected using the calculated measurement offset.

In another embodiment of the present disclosure, a method of measuring the position of an asset is provided. The method includes the steps of measuring position data associated with a first asset from outputs of a first plurality of global positioning system (GPS) sensors arranged on a first asset, and measuring reference position data of the first asset with a reference position source of the first asset. From these measurements, a measurement offset between the measured position data associated with the first asset and the reference position data obtained from the reference position source is calculated. Using this measurement offset, measured position data obtained from the plurality of GPS sensors of the first asset may be corrected. Likewise, position data measurements obtained from a plurality of GPS sensors of a second asset, located remotely from the first asset, may also be corrected using the calculated measurement offset.

DETAILED DESCRIPTION

Figure 1:
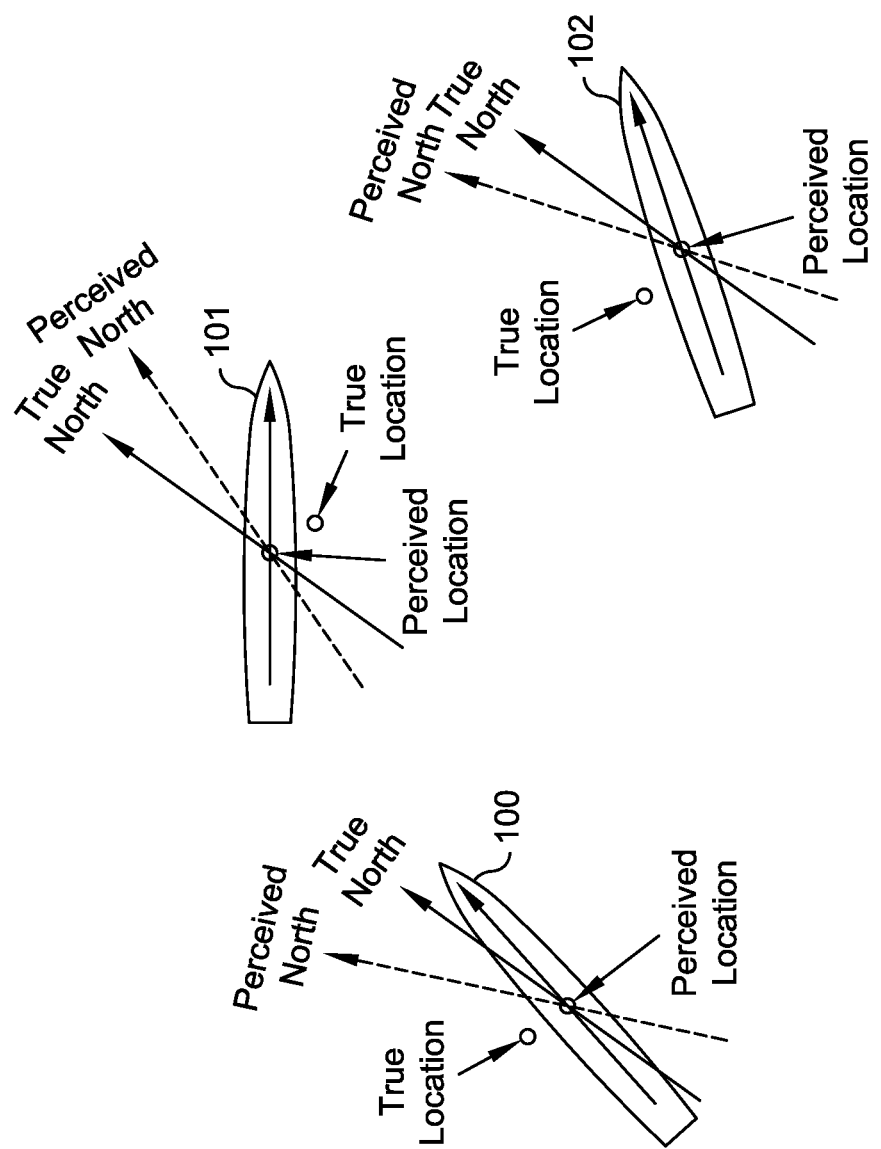
FIG. 1 is an exaggerated diagram illustrating the potential errors introduced by inaccurate GPS-based positioning systems currently used by marine assets.

It is to be understood that the figures and descriptions of the present invention have been simplified to illustrate elements that are relevant for a clear understanding of the present invention, while eliminating, for purposes of clarity, many other elements found in communications and positioning systems, such as GPS-based systems. However, because such elements are well known in the art, and because they do not facilitate a better understanding of the present invention, a discussion of such elements is not provided herein. The disclosure herein is directed to all such variations and modifications known to those skilled in the art.

In the following detailed description, reference is made to the accompanying drawings that show, by way of illustration, specific embodiments in which the invention may be practiced. It is to be understood that the various embodiments of the invention, although different, are not necessarily mutually exclusive. Furthermore, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout several views.

Embodiments of the present disclosure include systems and methods for improving the accuracy of measuring a position of an asset, such as a marine ship or a vessel, and for improving the performance of on-ship systems reliant on these position measurements. Embodiments also include systems and methods for generating real-time differential position and orientation data on single marine platforms that describes the gross structural distortion of the platform for purposes of correcting measured target track data. According to one method, a platform, ship or land-based location is designated as a master positional reference. Measured positions or measured position references of a selected group of neighboring secondary platforms or ships may be normalized to this master position reference in order to improve on-ship operations, such as aircraft tracking, as well as to improve the accuracy and efficiency of data sharing between these platforms. The accuracy of positional measurements of the platforms may also be improved by performing platform flexure measurements, as well as by accounting for local pitch and roll.

A system according to embodiments of the present disclosure may include a matrix of Differential Global Positioning Sensor (DGPS) units (e.g. 4 or 6), such as Carrier-Phase Differential Global Positioning Sensors (CDGPS) arranged in a high fidelity configuration on a platform or ship designated as a "master" or reference platform. In one embodiment, these sensors may be located on long baselines of the platform (e.g. along baselines of a ship) in an approximately rectangular formation. One CDGPS unit may be designated as a local reference for the platform. Position data measured by this master platform may be used to normalize position data measured from one or more secondary platforms or ships located in geographic proximity with the master reference platform. In one embodiment, the master reference platform would comprise the most stable platform, such as an aircraft carrier, if a ground platform is not available.

These embodiments provide a basis for secondary ships or platforms to estimate "True North" relative to their centerline by determining errors or offsets in measured positions. Embodiments may also measure, for example, any flexural twist of a ship or platform, and use this data to further correct measured position data. In other embodiments, the CDGPS units on each ship will be augmented by a differential accelerometer or other inclination measuring system to monitor angular tilt differences between locations on ship and fill in gaps to any loss of DGPS. Information will be filtered to take advantage of expected ship sinusoidal motions. The use of a shared relative True North between each of the platforms may improve cooperative efforts between these platforms, in addition to correcting ship navigation parameters. For example, in the context of an airborne target being tracked by multiple platforms, the use of a normalized True North among platforms reduces tracking errors as data is transmitted between the platforms, improving gridlocking operations.

Figure 2:
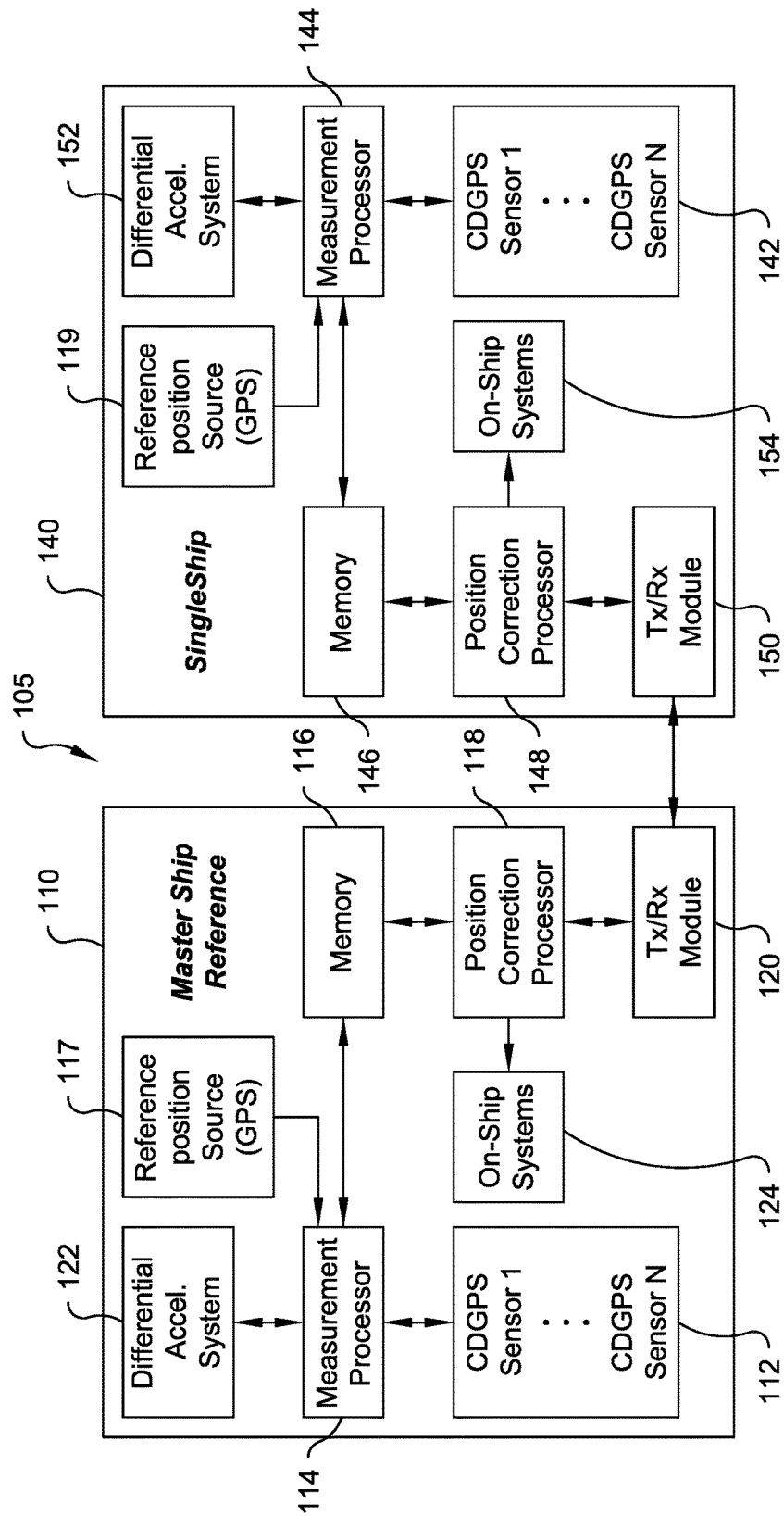
FIG. 2 is a system diagram of an embodiment of the present disclosure illustrating a master platform and an individual secondary platform in communication with one another.
Figure 10:
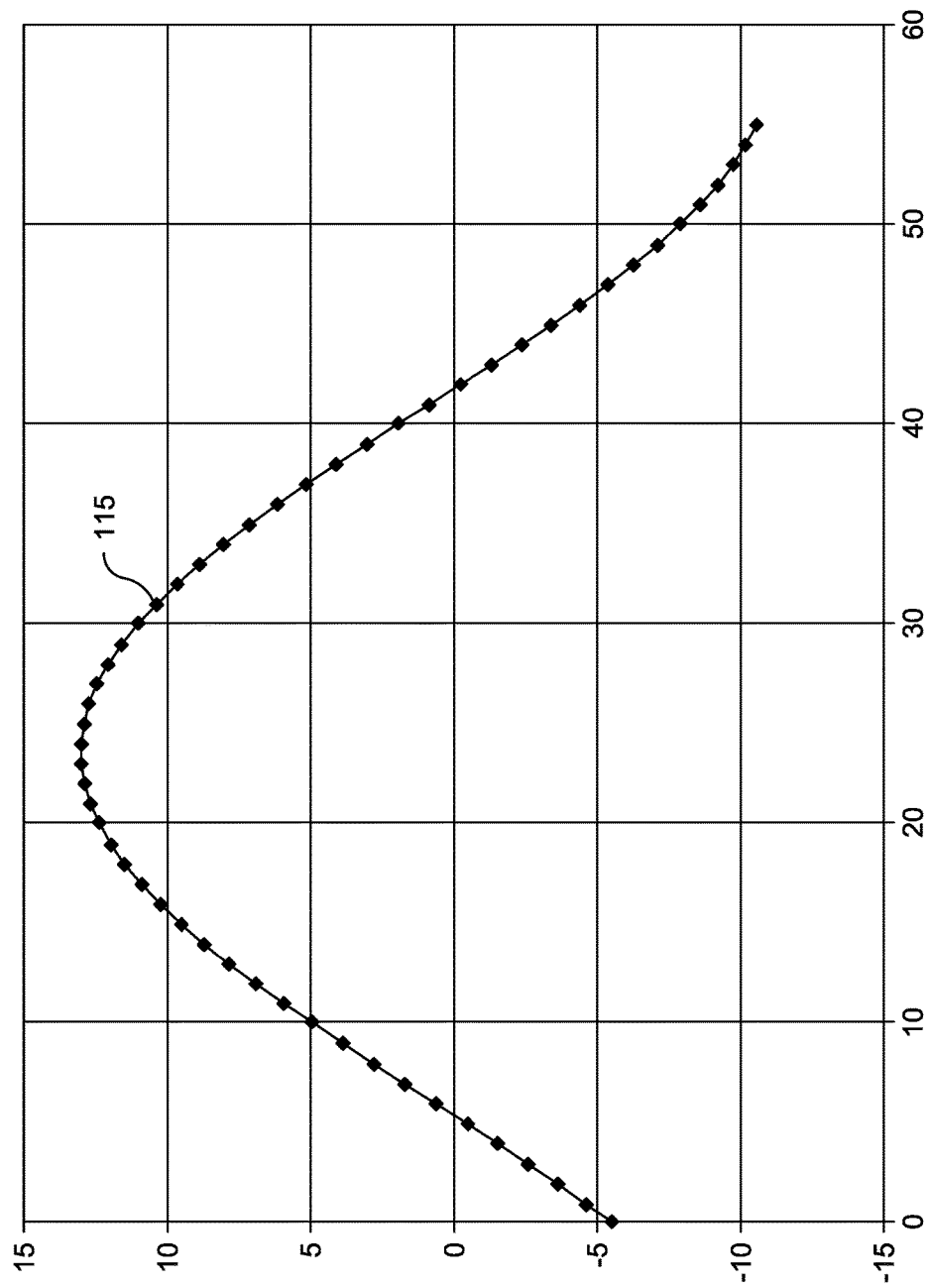
FIG. 10 is a graphical illustration of estimated sinusoidal motion of a platform.

Referring generally to FIG. 2, a system 105 according to an embodiment of the present disclosure includes an exemplary master platform or ship 110 and an exemplary secondary platform or ship 140. Master ship 110 includes a master ship DGPS system, comprising, for example, a matrix of 4 to 6 (or more) CDGPS sensors 112. Referring generally to FIGS. 3A and 3B, and FIGS. 4A and 4B, sensors 112 may be located along baselines of an exemplary ship, as will be set forth in greater detail below. Sensors 112 are operative to precisely measure position data at each of the illustrated points, and compare these measurements to a perceived position obtained from a reference position source 117, such as an on-board GPS system for determining a measurement offset. Position data is measured in real time, providing the ability to create time-filtered position estimates. A differential accelerometer or inclination system 122 may also be provided, and used to measure ship motion (e.g. sinusoidal motion) corresponding in time to the of the CDGPS measurements. Accelerometer/inclination system 122 may monitor angular tilt differences between various locations on ship and fill in gaps to any loss of CDGPS data. This information may also be filtered to take advantage of expected or measured ship sinusoidal motions. See, for example, FIG. 10, illustrating exemplary sinusoidal motion 115 of a vessel extrapolated from historical position and/or acceleration measurements.

A measurement processor 114 may be responsive to the outputs of these measuring devices for storing recorded position and/or acceleration data into a memory device 116. Measurement processor 114 may also be configured to calculate pitch, roll, and heading of ship 110, as well as calculate hull flexure, or twist, using this measured data. Measurements of pitch, roll, heading, and flexure may also be stored into memory device 116. A position correction processor 118 may be responsive to measured ship motion and flexure, as well as position data taken from CDGPS sensors 112 and reference position source 117, to generate reference correction data or a measurement offset. This reference correction data may account for local pitch, roll and flexure measurements, as well as any other errors induced by the CDGPS sensors. Errors can principally be detected by monitoring relative distances between sensors 112 on ship 110 and determining if those relative distances exceed reasonable structural tolerances (without catastrophic failure).

Local reference correction data may be utilized by other on-ship systems 124, for example, guidance and navigation systems, communications systems, radar or sonar systems, and the like. For example, this reference correction data or measurement offset may serve as a basis for determining the relative position of tracked airborne targets when utilized by the master ship's radar system(s). Master ship 110 further comprises a transceiver 120 forming part of a communications system for transmitting and receiving data between a plurality of platforms, including transmitting the above-described reference correction data. While the master platform 110 has been described herein as a ship, it should be understood that such a master reference may comprise a ground station (where available within a given region), or other suitably stable platform.

As described above, according to embodiments of the present disclosure, reference correction data generated by master ship 110 may be used by one or more secondary platforms or ships within a given geographical area. More specifically, other platforms, ships or vessels may be "assigned" or provided this reference correction data for use by their own on-ship systems. Still referring to FIG. 2, an exemplary secondary ship 140 is provided and may comprise a communications system, including a transceiver 150 responsive to received reference correction data transmitted from master ship 110 via transceiver 120.

Transceiver 150 may be configured to receive position data obtained from master ship 110 and store this data onto a memory device 146 for further processing. For example, as described above with respect to master ship 110, secondary platform or ship 140 may also comprise a matrix of, by way of non-limiting example only, four, six or more CDGPS sensors 142 for measuring its own local time-varying position with respect to a reference position obtained by a reference position source (e.g. a GPS system) 119. A measurement processor 144 may be provided, and responsive to the outputs of sensors 142, reference position source 119, and differential accelerometer/inclination system 152, for generating position data for ship 140, and storing it in memory 146. As set forth above, a differential accelerometer/inclination system 152 may be used to measure ship motion (e.g. sinusoidal motion) corresponding in time to the of the CDGPS measurements. Accelerometer/inclination system 152 may monitor angular tilt differences between various locations on ship and fill in gaps to any loss of CDGPS data.

Measurement processor 144 may also be configured to measure pitch, roll, and heading of ship 140, as well as measure hull flexure, or twist, using this data. Measurements of pitch, roll, heading, and flexure may also be stored into memory 146. A position correction processor 148 may be responsive to measured ship motion and flexure, as well as position data taken from CDGPS sensors 142, to generate local reference correction data. This reference correction data may be corrected for local pitch, roll and flexure measurements, as well as any other errors induced by CDGPS sensors 142. Position correction processor 148 may be further configured to compare the reference correction data of ship 140 generated by sensors 142, with the master reference correction data received from master ship 110, for determining any offset or error occurring therebetween. This comparison may be used to, for example, correct a local estimated True North to the True North of the master reference. Any deviations or offsets between the reference correction data and the local reference correction data may also be stored in memory 146.

Figure 5:
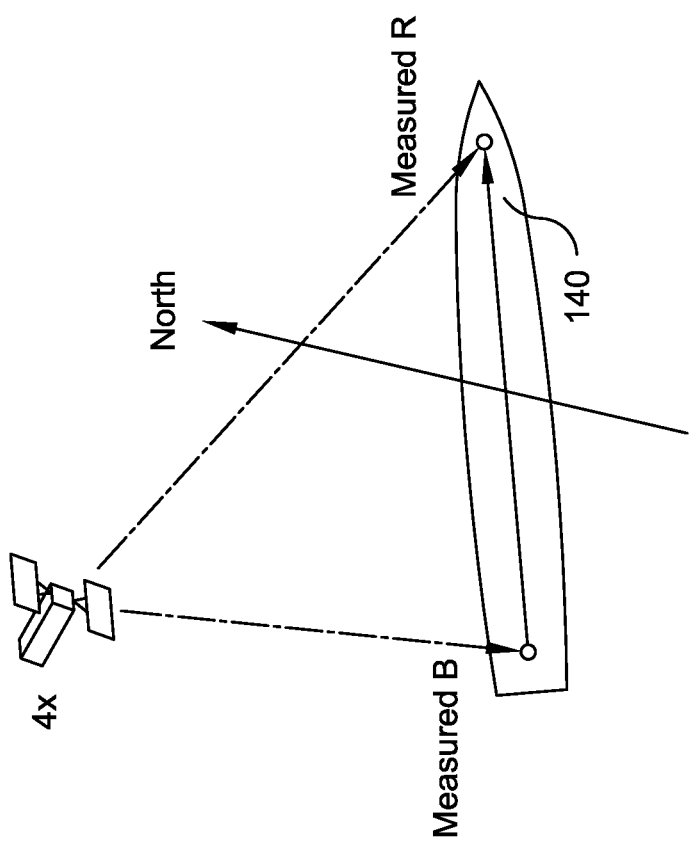
FIG. 5 illustrates the measurement of two notional exemplary points on a ship, as well as an estimated True North.
Figure 6:
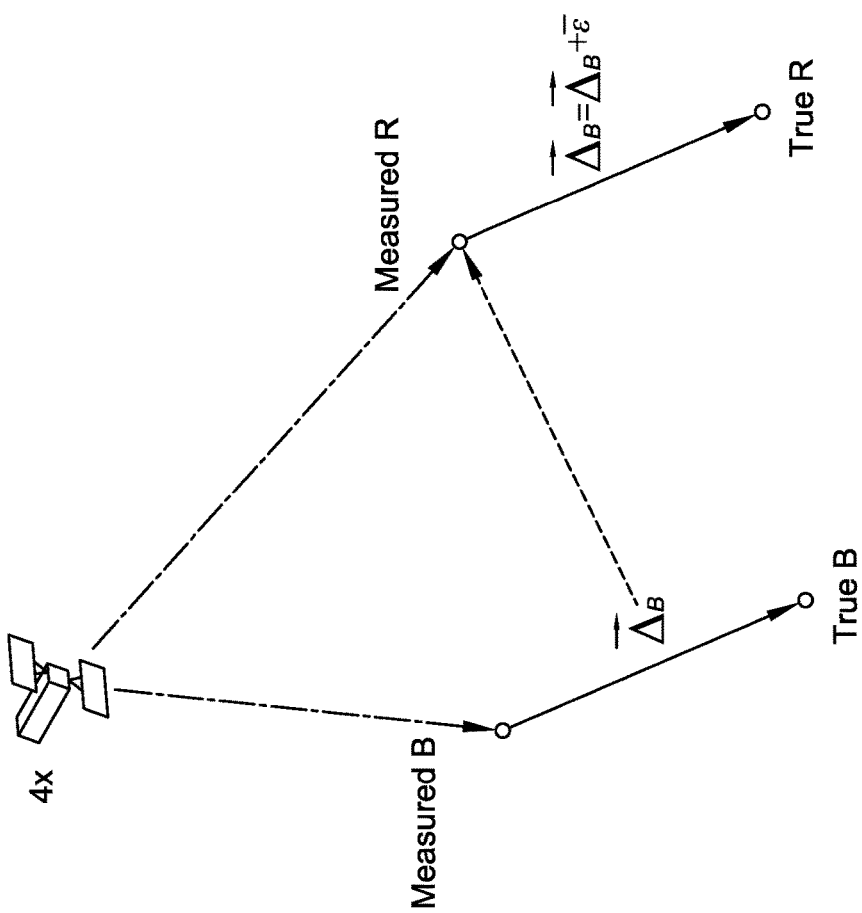
FIG. 6 illustrates the principles associated with correcting DGPS sensor data according to an embodiment of the present disclosure.
Figure 7:
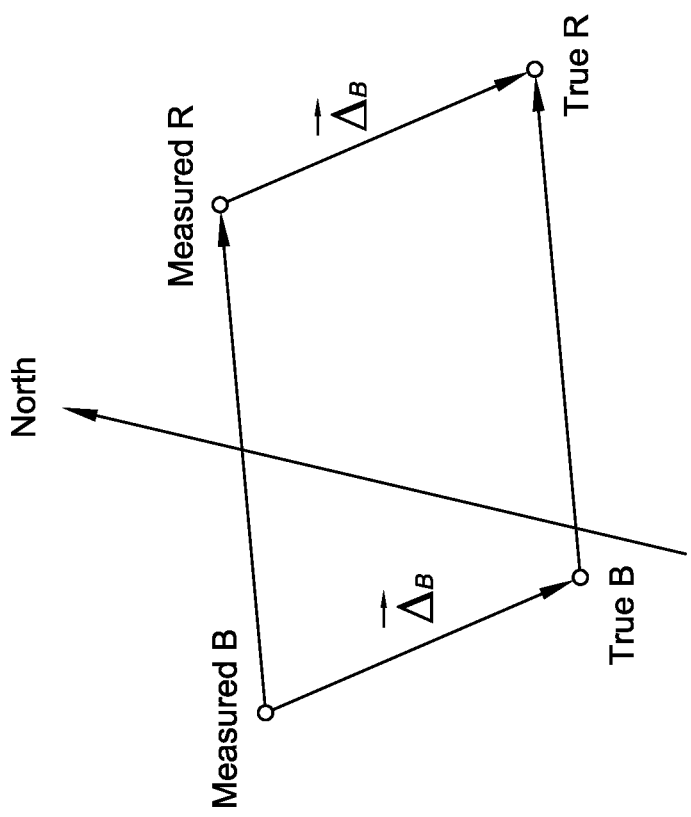
FIG. 7 illustrates the principles associated with correcting an estimated True North bearing according to an embodiment of the present disclosure.
Figure 8:
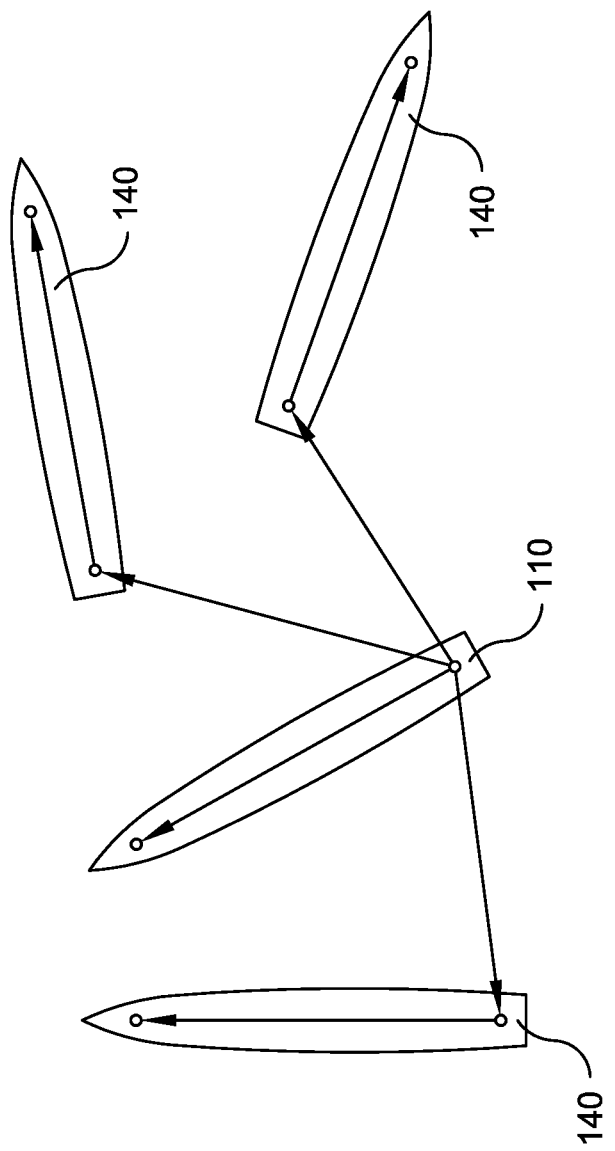
FIG. 8 illustrates the principle of sharing master ship reference data between multiple ships/platforms according to an embodiment of the present disclosure.

Position correction processor 148 may be further configured to correct the measured local position data for a given measured error. By way of example only, position correction processor 148 may be operative to calculate an offset or error between a measured True North and the master reference True North. From this measured offset, position data may be corrected (i.e. normalized to the master reference True North). Referring generally to FIG. 5, two exemplary measured points B and R, as well as an estimated local relative True North, for secondary ship 140 are shown. Referring generally to FIG. 6, point B may comprise the measured point of a CDGPS sensor designated as a local reference for the secondary platform. A calculated offset or error $\Delta_B$ may be applied to the position data corresponding to point B, to generate a corrected or true point B. Correction processor 148 may be used to apply the corrected offset $\Delta_B$ to the remaining sensors of the secondary platform (i.e. to the sensor measuring illustrated point R, for similar offset correction. Likewise, the master True North reference may be adopted for use by the system of secondary ship 140, as illustrated in FIG. 7. This corrected or normalized position data may be used by on-ship systems 154, such as a radar system of ship 140. FIG. 8 generally illustrates the sharing of master reference data generated by a designated master ship 110 between secondary platforms or ships 140, as set forth in detail above.

While the exemplary embodiment illustrates only a single ship 140, it should be understood that embodiments of the present disclosure relate to systems and methods for generating master reference position correction data for use by a plurality of ships or platforms operating in a given area. In this way, each of these platforms will be using shared, or normalized, corrected position data for use in each of their on-ship systems. As a result, improvements in the accuracies of these systems may be realized. Further, data shared between these systems, and corresponding systems of other platforms may be improved. In the case of airborne target tracking, for example, the use of normalized position data among a plurality of remotely-located radar systems improves these system's abilities to accurately communicate and pass tracking data between one another.

Figure 3:
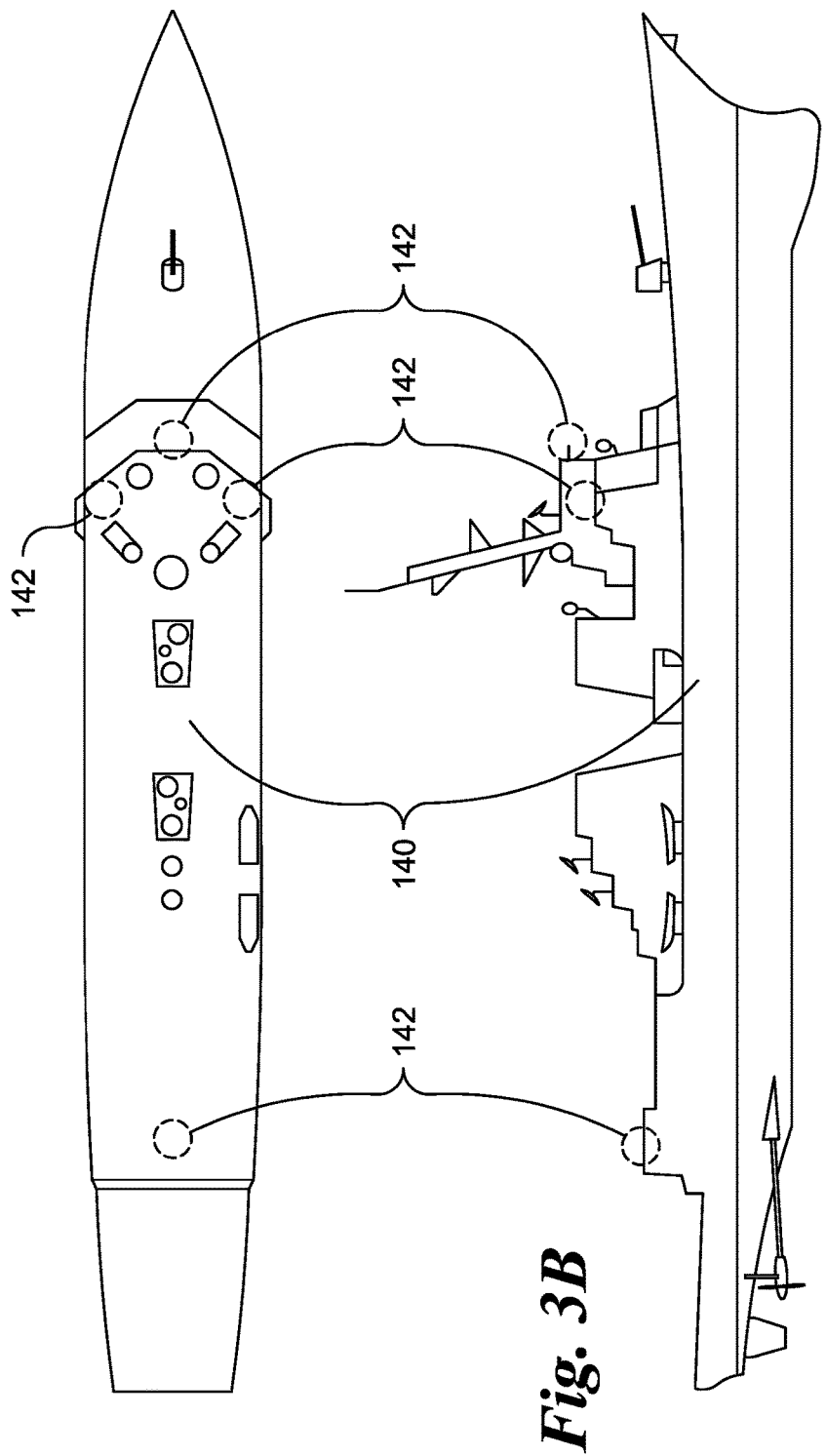
FIGS. 3A and 3B are diagrams illustrating notional locations for the placement of four (4) Differential Global Positioning Sensors (DGPS) sensors on a platform.

FIGS. 3A and 3B illustrate one exemplary advantageous mounting arrangement of four (4) CDGPS sensors 142 on ship 140. As illustrated, sensors 142 may be arrange generally along a centerline of an exemplary vessel, as well as along a line running generally perpendicular to this centerline. In this way, sensors may be operative to estimate roll, pitch and ship heading relative to an estimated True North.

Figure 4:
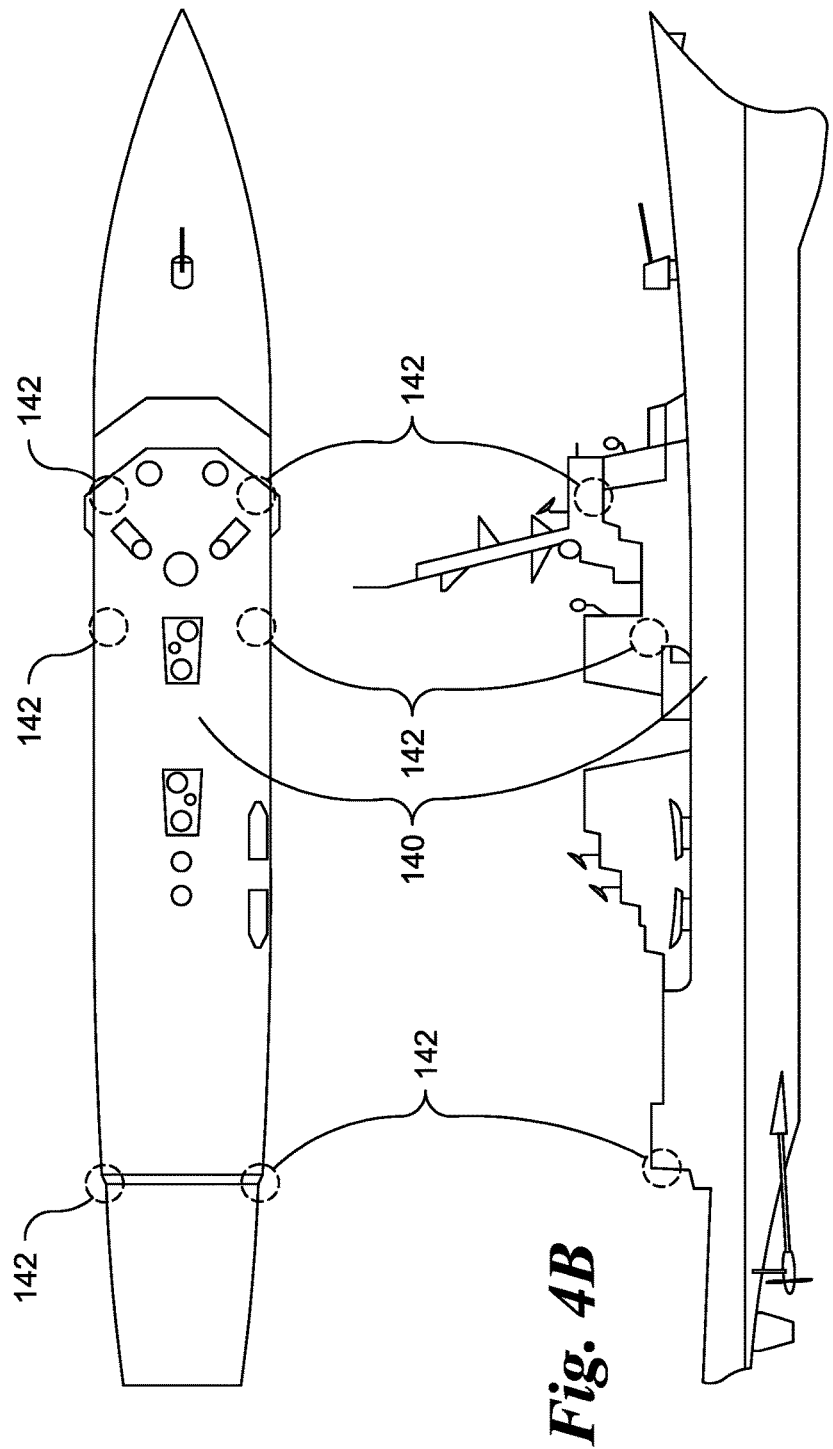
FIGS. 4A and 4B are diagrams illustrating notional locations for the placement of six (6) DGPS sensors on a platform.

Similarly, FIGS. 4A and 4B illustrate another exemplary mounting arrangement of six (6) CDGPS sensors 142 on ship 140. As shown, by arranging sensors 142 in a generally rectangular configuration, in addition to measuring roll, pitch, and heading relative to an estimated True North, relative flexural twist and bending of the ship's hull may also be estimated.

Figure 9:
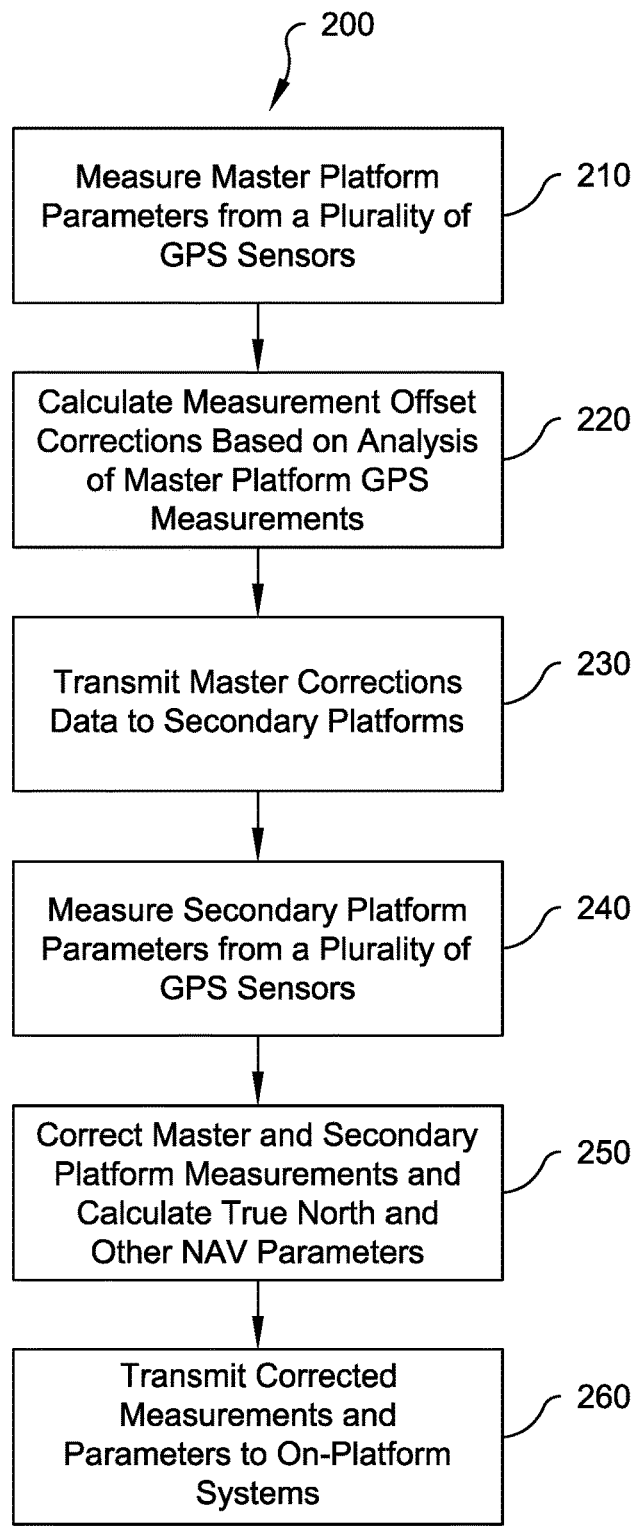
FIG. 9 is a process diagram illustrating an exemplary method of using master ship reference data to correct position data utilized by a master and secondary platforms.

Referring generally to FIG. 9, an exemplary method 200 according to embodiments of the present disclosure is provided. Positional measurements may be made 210 via one or more GPS sensors on a designated master reference platform. Measurement correction data or a measurement offset may be calculated 220 based on past measurements and analyses, including those based on position data obtained by an on-board reference position source, such as a GPS, similar to fixed reference base stations that provide references within DGPS. This may also include analyzing on-ship geometries and augmented measurements. This master correction data is then transmitted 230 to each secondary platform.

Secondary platforms or ships may make local position measurements 240, including corrected positional measurements based on established ship geometries. Corrections to this measured position data at respective secondary platforms are performed using the correction data received by the master reference platform, and offset or error values are calculated 250. These calculated offset or error values may be applied to each of the sensors of the secondary platforms (or applied to a reference sensor of each platform which, in turn, applies the offsets to data generated by the remaining sensors) for correcting 250 measurements made thereby. In this way, position and True North data, relative True North estimations, pitch, roll and heading estimates, as well as flexure measurements as set forth above are normalized to the master reference data 250. This normalized data is provided or transmitted 260 to other on-ship systems of each master and secondary platform for realizing the above-described benefits.

The embodiments are provided by way of example only, and other embodiments for implementing the methods described herein may be contemplated by one of skill in the pertinent art without departing from the intended scope of this disclosure. For example, systems, including the position correction and measurement processors, may include memory containing data (e.g. memory devices 116,146 of FIG. 2), which may include instructions, the instructions when executed by a processor or multiple processors, cause the steps of a method for performing the measurements and measurement corrections set forth herein. Software may be embodied in a non-transitory machine readable medium upon which software instructions may be stored, the stored instructions when executed by a processor cause the processor to perform the steps of the methods described herein. Any suitable machine readable medium may be used, including but not limited to, magnetic or optical disks, for example CD-ROM, DVD-ROM, floppy disks and the like. Other media also fall within the intended scope of this disclosure, for example, dynamic random access memory (DRAM), random access memory (RAM), read-only memory (ROM) or flash memory may also be used. In one embodiment, the measurement and correction hardware and software can be implemented using any real time operating system software and associated DSP hardware, an FPGA, custom hardware and software, by way of non-limiting examples only. The processor type and software must be configured such that the timing of the system can be maintained.

While the foregoing invention has been described with reference to the above-described embodiment, various modifications and changes can be made without departing from the spirit of the invention. Accordingly, all such modifications and changes are considered to be within the scope of the appended claims. Accordingly, the specification and the drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations of variations of various embodiments. Combinations of the above embodiments, and other embodiments not specifically described herein, will be apparent to those of skill in the art upon reviewing the above description.

What is claimed is:

1. A system for measuring a position of an asset comprising:
    a first plurality of global positioning system (GPS) sensors arranged on a first asset;
    a reference position source arranged on the first asset;
    one or more computer processors; and
    a memory in communication with the one or more processors and storing program instructions, the one or more processors operative with the program instructions to:
        measure position data associated with the first asset from the outputs of the first plurality of GPS sensors;
        calculate a measurement offset between the measured position data associated with the first asset and position data obtained from the reference position source and a differential accelerometer/inclination system on the first asset that measures sinusoidal asset motion and monitors angular tilt differences between multiple locations on the first asset at intervals corresponding in time to the position data measurements of the first plurality GPS sensors;
        correct the measured position data obtained from the plurality of GPS sensors of the first asset using the calculated measurement offset, the corrected position data including at least an estimate of True North;
        correct position data measured from a plurality of GPS sensors of a second asset, located remotely from the first asset, using the calculated measurement offset; and
        transmit the estimate of True North to a radar system of the second asset for determining a relative position of a tracked airborne target tracked by said first and second assets;
        wherein the differential accelerometer/inclination system on the first asset measures sinusoidal asset motion and monitors angular tilt differences between multiple locations on the first asset at intervals corresponding in time to the GPS sensor measurements, the sinusoidal asset motion and angular tilt differences outputs being applied to the position data measured by the GPS sensors, to fill in gaps upon loss of measured position data of the GPS sensors, and wherein the measured asset motion from the differential accelerometer/inclination system is filtered according to historical position and acceleration measurements.

2. The system of claim 1, wherein the plurality of GPS sensors are Carrier-Phase Differential GPS (CDGPS) sensors and are aligned along a centerline of the first asset and along a line perpendicular to the centerline and configured to estimate roll, pitch and ship heading relative to an estimated True North.

3. A method of measuring a position of an asset comprising:
    measuring position data associated with a first asset from outputs of a first plurality of global positioning system (GPS) sensors arranged on a first asset;
    measuring reference position data of the first asset with a reference position source of the first asset;
    measuring sinusoidal asset motion and monitoring angular tilt differences between multiple locations on the first asset at intervals corresponding in time to the position data measurements of the first plurality GPS sensors, using a differential accelerometer/inclination system to thereby provide asset motion and angular tilt data;
    calculating a measurement offset between the measured position data associated with the first asset and the reference position data obtained from the reference position source and the differential accelerometer/inclination system, wherein the sinusoidal asset motion data and angular tilt differences outputs are applied to the position data measured by the GPS sensors, to fill in gaps upon loss of measured position data of the GPS sensors, and wherein the measured asset data is filtered according to historical position and acceleration measurements;
    correcting the measured position data obtained from the plurality of GPS sensors of the first asset using the calculated measurement offset, the corrected position data including at least an estimate of True North;
    correcting position data measured from a plurality of GPS sensors of a second asset, located remotely from the first asset, using the calculated measurement offset; and
    transmitting the estimate of True North to a radar system of the second asset for determining a relative position of a tracked airborne target tracked by said first and second assets.

4. The method of claim 3, wherein the step of measuring the position data associated with the first asset from the output of the first plurality of GPS sensors includes providing Carrier-Phase Differential GPS (CDGPS) sensors and aligning a portion of said CDGPS sensors along a centerline of the first asset and a remainder along a line perpendicular to the centerline for estimating roll, pitch and ship heading relative to an estimated True North.

5. The method of claim 4, wherein at least two of said CDGPS sensors are aligned along a centerline of the first asset and at least two other of said CDGPS sensors are aligned along a line perpendicular to the centerline of the first asset.

6. The method of claim 3, wherein the first plurality of GPS sensors includes at least six sensors arranged in a generally rectangular configuration on the first asset.

7. The system of claim 2, wherein the first plurality of CDGPS sensors includes at least two CDGPS sensors arranged along the centerline of the first asset and at least two other CDGPS sensors arranged along a line perpendicular to the centerline of the first asset.

8. The system of claim 1, wherein the first plurality of GPS sensors includes at least six sensors arranged in a generally rectangular configuration on the first asset.

* * * * *